(12) United States Patent
Niimi et al.

(10) Patent No.: US 6,466,853 B1
(45) Date of Patent: Oct. 15, 2002

(54) VEHICLE TRANSMISSION AND AIR CONDITIONING CONTROL SYSTEM

(75) Inventors: Yasuhiko Niimi, Handa; Yasushi Yamanaka, Nakashima-gun; Koichi Ban, Tokai; Kazuhito Miyagawa, Kariya; Yuichi Shirota; Hiroshi Kishita, both of Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/689,438

(22) Filed: Oct. 12, 2000

(30) Foreign Application Priority Data

Oct. 14, 1999 (JP) .......................................... 11-292606

(51) Int. Cl.$^7$ .............................. B60H 1/32; G06F 17/00
(52) U.S. Cl. ............................... 701/65; 701/53; 477/97
(58) Field of Search ....................... 701/65, 53; 477/97, 477/98, 107

(56) References Cited

U.S. PATENT DOCUMENTS 4,850,935 A * 7/1989 Morimoto .................... 474/18
5,172,563 A * 12/1992 Fujii ............................ 62/158
5,319,555 A * 6/1994 Iwaki et al. ................. 477/120
5,897,455 A * 4/1999 Sato et al. .................... 477/107

FOREIGN PATENT DOCUMENTS

| JP | 62-052265 A | * | 3/1987 |
| JP | A-11-20459 | | 1/1999 |
| JP | 2000-179670 | * | 6/2000 |

* cited by examiner

Primary Examiner—Michael J. Zanelli
(74) Attorney, Agent, or Firm—Harness, Dickey & Pierce, PLC

(57) ABSTRACT

In the transmission and air conditioning control system having an air conditioner provided with a compressor driven by an engine and an evaporator for cooling a passenger room, and a transmission connected between the engine and a wheel, an electronically control device controls the transmission ratio to a reference value to be decided by the operating condition of the vehicle and also to a final value, which is higher than the reference value, when a degree of cooling demand is greater than a predetermined value. As a result, the revolution of the engine is more increased so that the revolution of compressor may be more increased to improve the cool down performance.

7 Claims, 10 Drawing Sheets

VEHICLE TRANSMISSION AND AIR CONDITIONING CONTROL SYSTEM

CROSS REFERENCE TO RELATED APPLICATION

This application is based upon and claims the benefit of priority of Japanese Patent Application No. H.11-292606 filed on Oct. 14, 1999, the content of which is incorporated herein by reference.

BACKGROUND OF THE INVENTION

1. Field of the Invention

The present invention relates to a vehicle transmission and air conditioning control system for controlling a non-stage or multi-stage transmission in which a transmission ratio may be varied continuously or stepwise according to a degree of cooling demand of an air conditioner to change a revolution of compressor.

2. Description of Related Art

Conventionally, JP-A-11-20459 describes a vehicle transmission and heating control system in which a transmission ratio is changed according to a degree of heating demand of an air conditioner to change water temperature. However, the conventional vehicle transmission control system controls the transmission ratio only corresponding to heating demand of the air conditioner, not the transmission ratio corresponding to cooling demand of the air conditioner.

SUMMARY OF THE INVENTION

In view of the matter mentioned above, an object of the present invention is to provide a vehicle transmission and air conditioning control system in which a transmission output to input ratio is controlled according to a degree of cooling demand of an air conditioner to improve cooling feeling of passengers.

It is another object of the present invention to control the transmission ratio according to the degree of cooling demand of the air conditioner so that fuel consumption of a vehicle engine may be improved.

Further object of the present invention is to control the transmission ratio so as to reduce a consumption power of a variable capacity compressor to be used in the air conditioner.

It is a furthermore object of the present invention to control the transmission ratio so as to reduce a shock caused by an intermittent operation (on and off operation) of a fixed capacity compressor to be used in the air conditioner.

To achieve the one or more objects mentioned above, in the transmission and air conditioning control system comprising an air conditioner provided with a refrigeration cycle having a compressor driven by an engine and an evaporator for cooling a passenger room, and a transmission connected between the engine and a wheel for changing an input revolution on a side of the engine to an output revolution on a side of the wheel at a transmission ratio of the input revolution to the output revolution, an electronically control device controls the transmission ratio to a reference value to be decided by the operating condition of the vehicle then prevailing and to a final value, which is higher than the reference value, when a degree of cooling demand is greater than a predetermined value.

With the system mentioned above, when the degree of cooling demand is high, for example, at a time of cool down just after starting cooling, the transmission ratio is corrected to a higher value so as to increase the vehicle engine revolution. As a result, revolution of the compressor is increased so that cooling capacity (cool down performance) of the evaporator may be improved, while the cooling feeling of a passenger is also improved.

Further, the electronically control device may control the transmission ratio to a reference value to be decided by the operating condition of the vehicle then prevailing and to a final value, which is lower than the reference value, when the degree of cooling demand decided is smaller than a predetermined value.

In this case, when the degree of cooling demand is low, for example, in a capacity control region where temperature in the passenger room reaches near a preset temperature, the transmission ratio is corrected to a lower value so as to shift the engine operation to a high efficiency range of low engine revolution and high torque. As a result, fuel consumption of the engine may be improved.

When the compressor is a variable capacity compressor whose discharge capacity is varied according to cooling degrees of the evaporator, the revolution of the compressor may reduce and the discharge capacity of the compressor may increase to improve a compression efficiency. Accordingly, consumed power of the compressor is saved to further improve the engine fuel consumption.

It is preferable, in this case, that the discharge capacity of the variable capacity compressor is used to determine the degree of cooling demand.

When the compressor is a fixed capacity compressor whose operation is intermittently controlled according to cooling degree of the evaporator, the revolution of the compressor may reduce so that on time period of the compressor operation becomes longer. Accordingly, as the intermittent operation number of the compressor becomes smaller, the shock due to the intermittent on and off operation is reduced.

It is preferred, in this case, that the operating percentage of the fixed capacity compressor is used to determine the degree of cooling demand.

Furthermore, the degree of cooling demand may be determined by at least one of a largeness of deviation between temperature of the evaporator and target temperature of the evaporator, a largeness of temperature of the passenger room, a largeness of physical quantity showing a cooling degree of the evaporator, a largeness of target temperature of air blown into the passenger room, a largeness of passenger preset temperature in the passenger room and a largeness of deviation between the temperature of the passenger room and the passenger preset temperature in the passenger room.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS (First Embodiment)

Figure 1:
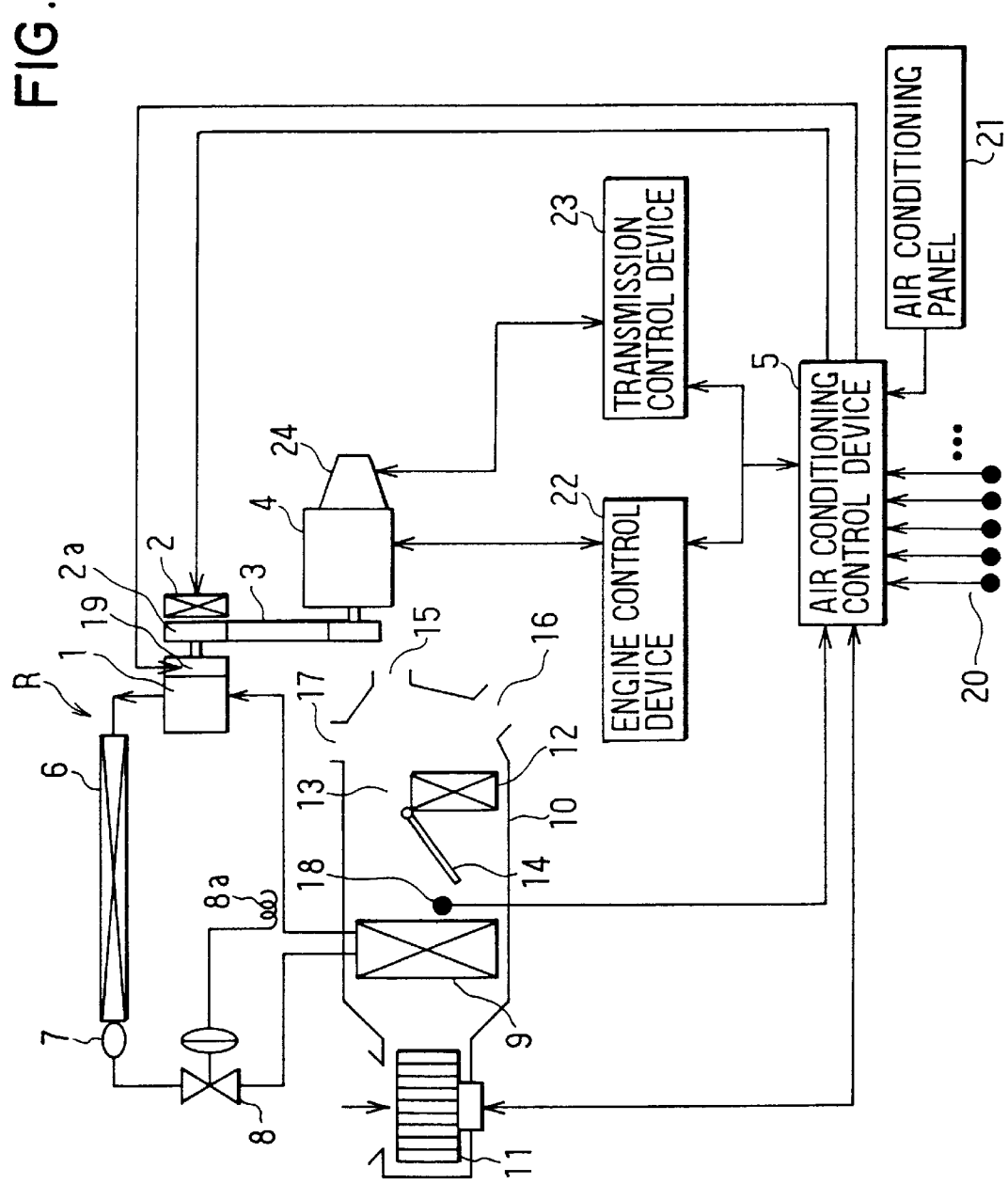
FIG. 1 is a schematic view showing a structure of a transmission and air conditioning control system according to a first embodiment of the present invention.

FIG. 1 shows an entire structure according to a first embodiment of the present invention. A compressor 1, which sucks, compresses and discharges refrigerant, is provided in a refrigeration cycle of an air conditioner for vehicles. The compressor 1 is provided with an electromagnetic clutch for transmitting and interrupting a driving force. The driving force generated by a vehicle engine 4 is transmitted via a belt 3 and a pulley 2a of the clutch 2 to the compressor 1. An air conditioning electronic control device 5 controls a current supply to the clutch 2 and, when the current supply to the clutch 2 is interrupted, an operation of the compressor 1 stops.

High temperature and high pressure superheated gas refrigerant discharged from the compressor 1 is flown to a condenser 6. The condenser 6 takes heat out of the refrigerant by heat exchanging with outside air sent from a cooling fan (not shown) so that the refrigerant may be cooled and condensed.

The refrigerant condensed by the condenser 6 is flown to a receiver 7. The receiver 7 is operative to separate the refrigerant into liquid phase and gas phase refrigerant and store excessive refrigerant (liquid) in the refrigeration cycle.

An expansion valve 8 (pressure decreasing device) decreases pressure of the liquid phase refrigerant so as to obtain low pressure dual liquid and gas phase refrigerant. The low pressure refrigerant from the expansion valve 8 is sent to an evaporator 9 (heat exchanger for cooling). The evaporator 9 is installed in an air conditioning case 10 of the vehicle air conditioner. The low pressure refrigerant flown into the evaporator 9 evaporates to absorb heat out of air in the air conditioning case.

The expansion valve 8 is a temperature dependent expansion valve having a temperature sensing unit 8a that senses temperature of refrigerant at an outlet of the evaporator 9. An opening degree of the expansion valve 8 (flow amount of refrigerant) may be adjusted to keep a refrigerant superheating rate at the outlet of the evaporator 9 at a predetermined value. The outlet of the evaporator 9 is connected to a suction side of the compressor 1. A closed loop refrigeration cycle is constituted by the parts and components mentioned above.

Air passages for air conditioning are formed in the air conditioning case 10. The air conditioning case 10 is provided with a blower 11 on an upstream side of the evaporator 9. An inside and outside air change over box (not shown) is arranged on an intake side (on an upper side in FIG. 1) of the blower 11. Air in a passenger room (inside air) or air outside the passenger room (outside air), which is switched by the inside and outside air change over box, is introduced to the air conditioning case 10 by the blower 11.

A hot water type heater core 12 (heat exchanger for heating), in which air is heated by hot water of the vehicle engine 4 as a heat source, is installed in the air conditioning case 10 on a downstream side of the evaporator 9. A bypass passage 13 is provided on a side of the heater core 12 and an air mix door 14 adjusts an air volume ratio of warmed air passing through the heater core 12 to cooled air passing through the bypass passage 13. The air mix door 14 is a temperature-adjusting unit for adjusting temperature of air blown out into the passenger room by changing the air volume ratio of the warmed air to the cooled air.

In the air conditioning case 10 at an air downstream end, provided are a face air outlet 15 for blowing out air toward a upper half part of the passenger in the passenger room, a foot air outlet 16 for blowing out air toward a foot part of the passenger and a defroster air outlet 17 for blowing out air toward an inside surface of a front wind shield glass. The respective air outlets 15 to 17 are controlled to open and close by changing over air blow mode doors (not shown). The air mix door 14 and the air blow mode doors are driven via a link mechanism by an electric driving unit such as a servomotor.

An evaporator air blow temperature sensor 18 (an unit for detecting an air cooling degree by the evaporator), which is composed of a thermometer, is provided at a position where air is blown out from the evaporator 9 in the air conditioning case 10.

According to the first embodiment, the compressor 1 is an outside control type variable capacity compressor in which a discharge capacity is varied by control signals from outside. The outside control type variable capacity compressor 1 is well known and, for example, may be a swash plate type compressor having a variable capacity device 19 composed of an electromagnetic pressure control device for controlling pressure of a swash plate chamber in use of discharge pressure and suction pressure. Controlling pressure of the swash plate chamber varies an inclination angle of the swash plate so that a stroke of a piston, that is, the discharge capacity of the compressor, may be continuously changed.

The electronic air conditioning control device 5 controls a current supply to the variable capacity device 19. Typically, as the current to be supplied to the variable capacity device 19 increases, the discharge capacity of the compressor decreases. The increase or decrease of the discharge capacity of the compressor 1 and the communication or interruption of the electromagnetic clutch 2 are controlled to change the cooling capacity of the evaporator so that the temperature of the evaporator 5 (the evaporator air blow out temperature) may be kept at a predetermined temperature. Accordingly, controls for preventing frost of the evaporator 5, saving a power of the compressor 1 and the like can be achieved.

Signals of a group of well known sensors 20 for detecting inside temperature, outside temperature, sunshine amount, engine coolant (hot water) temperature and so on are input to the electronic air conditioning control device 5. Further, signals of operation switches for controlling an air conditioning control panel 21 at a vicinity of a dashboard in the passenger room are also input to the electronic air conditioning control device 5.

The electronic air conditioning control device 5 is connected in circuit to an electronic engine control device 22 and a transmission control device 23 for vehicles. Output and input signals of the control devices 5, 22 and 23 may be used commonly. The electronic engine control device 22, which is well known, controls over all operations of the vehicle engine 4 such as fuel injection amount and ignition timing based on signals of a group of sensors for detecting operating states of the vehicle engine 4.

A non-stage transmission 24 (CVT) in which a transmission ratio is continuously variable is attached to the vehicle engine 4. The non-stage transmission 24 is provided, as is well known, with an input variable pulley to be connected on a side of the vehicle engine 4 and an output variable pulley to be connected to a drive shaft on a side of driving wheels. A belt is attached to the two variable pulleys so as to bridge the variable pulleys. Each width of the variable pulleys may be changed continuously by hydraulic pressure (line pressure) of a hydraulic mechanism.

The line pressure control of the hydraulic mechanism for changing the width of the variable pulleys varies continuously the transmission ratio of the non-stage transmission 24. The transmission ratio is a ratio (Ni/No) of an input revolution Ni of the non-stage transmission to an output revolution No thereof. The transmission control device 23 calculates the line pressure of the hydraulic mechanism mentioned above according to operating conditions of the vehicle engine 4 such as a throttle opening degree and a vehicle speed and controls the transmission ratio.

Figure 2:
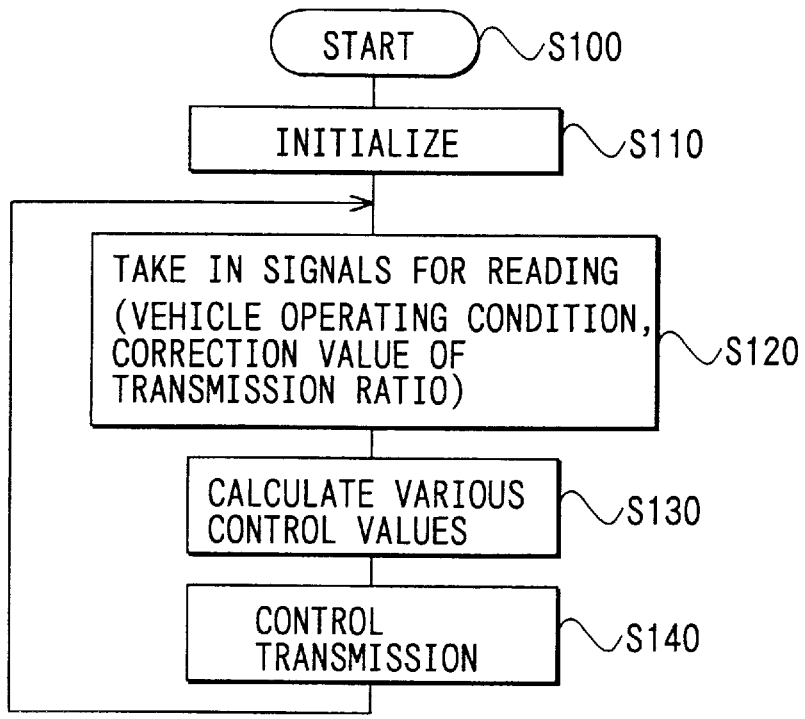
FIG. 2 is a flowchart showing an outline of transmission control processes according to the first embodiment.

Next, an operation of the transmission control device 23 according to the first embodiment of the present invention is described. FIG. 2 shows a flow chart for transmission basic control that is processed by the transmission control device 23. At Step S110, timers and control flags are initialized. Next, at Step S120, signals of vehicle operating conditions such as an engine throttle opening degree, an engine revolution and a vehicle speed and a signal for correcting the transmission ratio that is calculated by the electronic air conditioning control device 5 are taken in for reading.

Various control values for determining the transmission ratio of the non-stage transmission 24 including a control value for determining the line pressure are calculated at Step S130. The detail of the line pressure calculation is described later with reference to FIG. 7. At Step S140, the hydraulic mechanism is driven to control the transmission ratio of the non-stage transmission 24 in a manner that the line pressure of the non-stage transmission 24 satisfies the above-calculated value.

Figure 3:
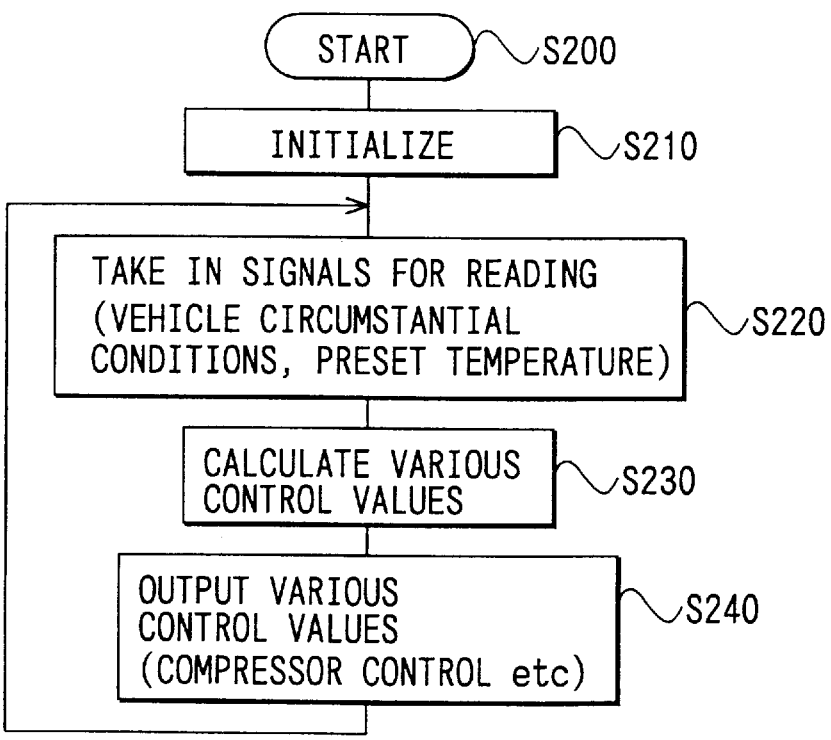
FIG. 3 is a flowchart showing an outline of air conditioning control processes according to the first embodiment.

FIG. 3 shows a flow chart for air conditioning basic control that is processed by the electronic air conditioning control device 5. At Step S210, timers and control flags are initialized. Next, at Step S220, a signal from the sensor 18 showing the evaporator air blow out temperature TE, signals from the group of sensors 20 such as the inside temperature TR, the outside temperature TAM, the sunshine amount TS and the engine coolant temperature TW and the signals of the operation switches of the air conditioning control panel 21 (such as preset temperature Tset) are taken in for reading.

Figure 4:
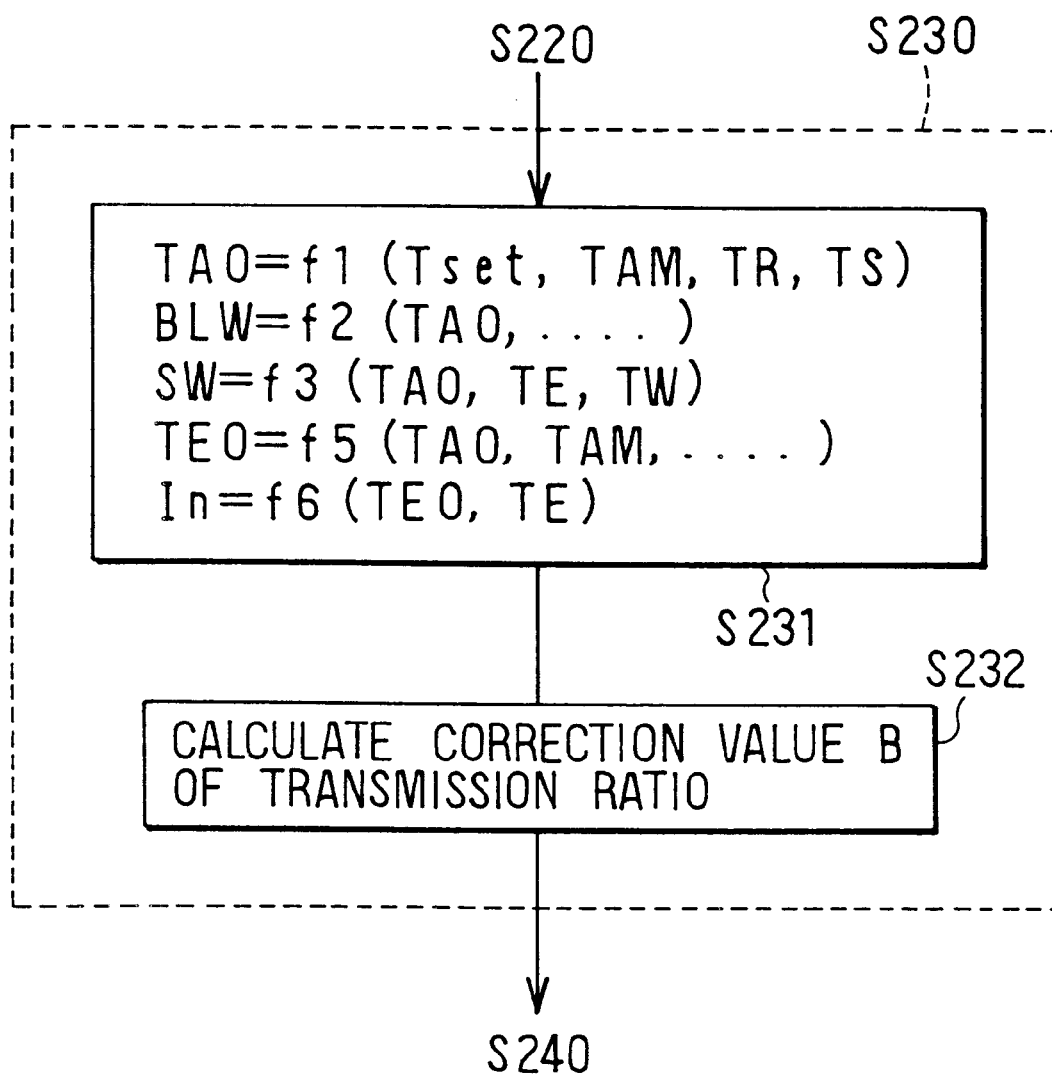
FIG. 4 is a flowchart showing a part of processes shown in FIG. 3.

Next, various control values for air conditioning automatic control are calculated. Calculation processes of the control values mentioned above may be of a well known way and are described briefly hereinafter with reference to FIG. 4, which shows an outline of the calculation at Step S230.

At Step S231, a target air blow temperature TAO, which is temperature of air blown to the passenger room necessary for maintaining the passenger room at the preset temperature Tset set by the passenger, is calculated based on Tset, TAM, TR and TS.

BLW, which is an airflow volume of the blower 11, is calculated based on Tset. An opening degree SW of the air mix door 14 is calculated based on TAO, TE and TW. The target evaporator air blow out temperature TEO is calculated based on TAO and TAM. A control current In for the variable capacity device 19 is calculated based on the actually detected evaporator air blow out temperature TE and the target evaporator air blow out temperature TEO. At Step S232, a transmission ratio correction value B, detail of which is described later, is calculated.

Next, the process goes to Step 240, at which various control values are output to the respective devices for the air conditioning automatic control such as the capacity control of the compressor 1, the transmitting and interrupting control of the electromagnetic clutch 2, the airflow control of the blower 11 and the opening degree control of the air mix door 14.

Figure 5:
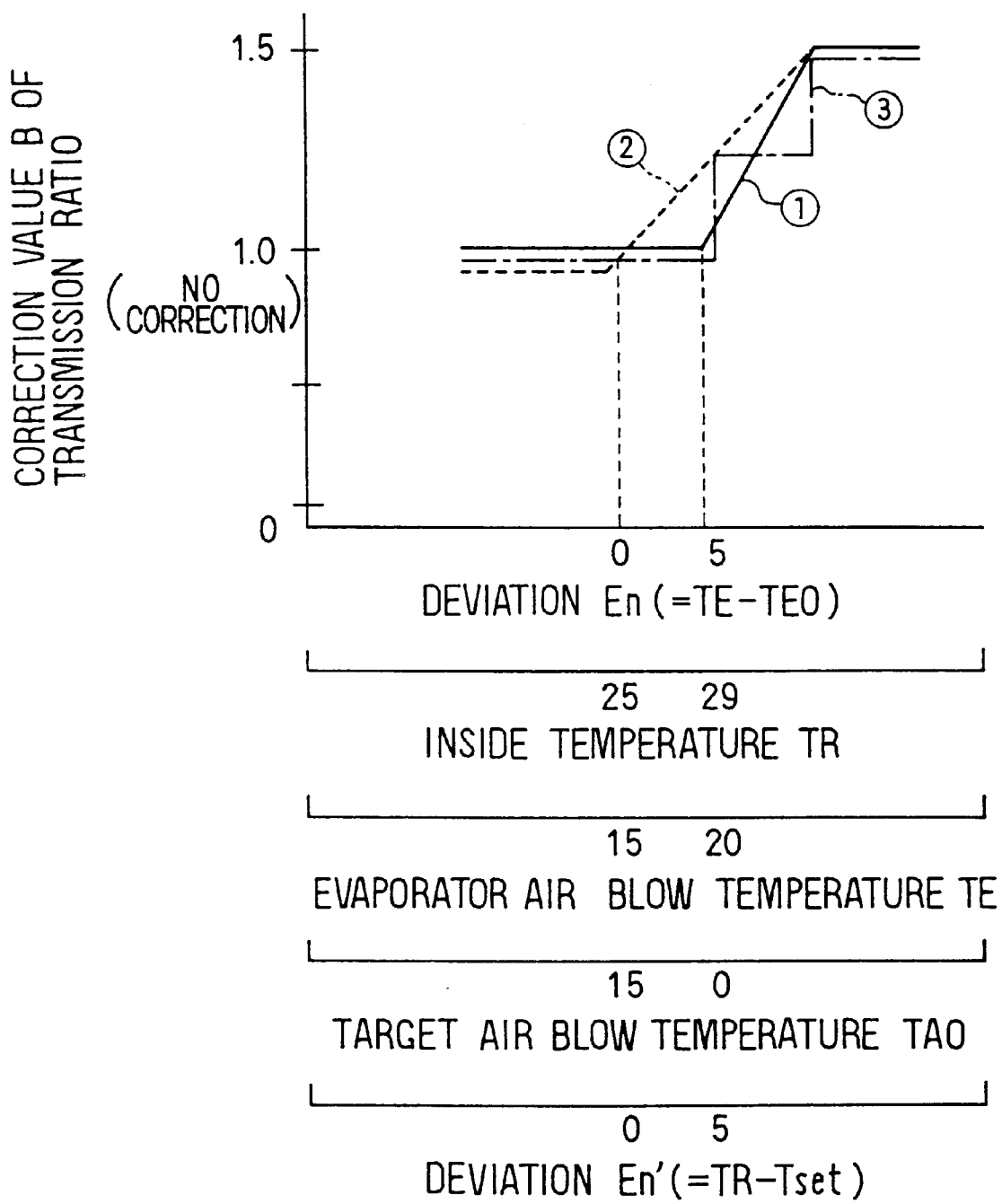
FIG. 5 is a characteristic chart showing a map for calculating a transmission ratio correction factor in FIG. 4.
Figure 6:
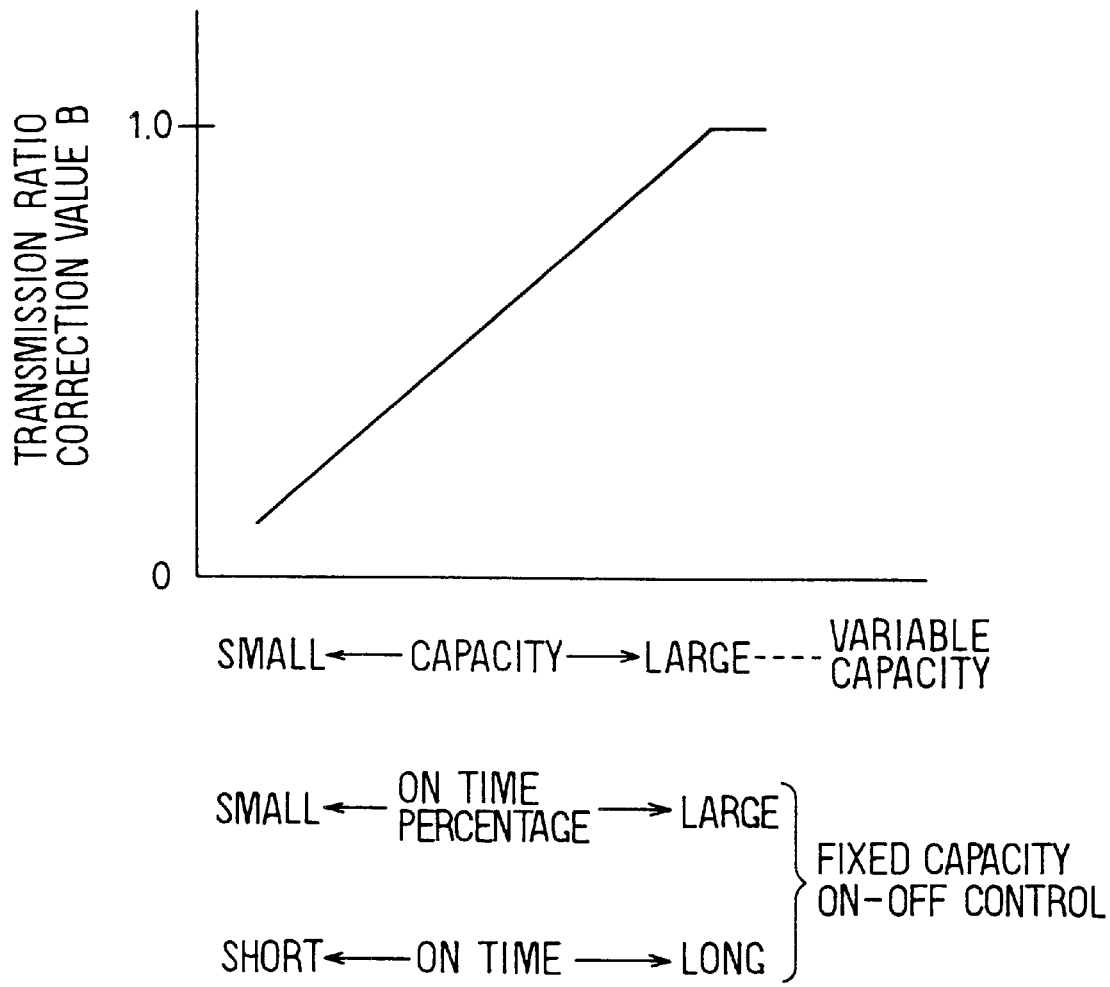
FIG. 6 is a characteristic chart showing another map for calculating the transmission ratio correction factor in FIG. 4.

FIGS. 5 and 6 show control maps for calculating the transmission ratio correction value B. FIG. 5 is the map applicable in a case that heat load for cooling is heavy, typically at a cool down timing just after starting cooling and, that is, the actually detected evaporator air blow out temperature TE is higher that the target evaporator air blow out temperature TEO. The transmission ratio correction value B is calculated based on a deviation En between the actually detected evaporator air blow out temperature TE and the target evaporator air blow out temperature TEO. The deviation En is atypical index (information) representing the degree of cooling demand of an air conditioner and becomes a larger value, as the degree of cooling demand is higher. Three control maps shown in a rigid line ①, in a broken line ②, and in a dot-slash line ③ are illustrated in FIG. 5. According to the control map shown in the rigid line ①, in a range that the deviation En is larger than a predetermined Eno(5° C. in this case), the transmission ratio correction value B becomes a value larger than 1 as the deviation En becomes higher (as the extent of cooling demand becomes larger). However, B =1.5 is set as an upper limit value in a case shown in FIG. 5.

When the deviation En becomes below the predetermined value Eno after cooling in the passenger room has been advanced, the transmission ratio correction value B is 1.0 (no correction) in view of a judgment that the evaporator air blow out temperature TE has decreased to a level corresponding to the degree of cooling demand.

Though, in a case of the control map ①, the transmission ratio correction value B is continuously changed between the neutral value 1.0 and the upper limit value, the transmission ratio correction value B in a case of the control map ③ is stepwise changed. Further, the control map ② has a characteristic that the predetermined value Eno is zero (0) and the transmission ratio correction value B is continuously reduced toward the neutral value 1.0 until the deviation En reaches 0.

As shown in FIG. 5, instead of the deviation En, the inside temperature TR, the evaporator air blow out temperature TE, the target temperature TAO of air blown to the passenger room or a deviation En' between the inside temperature TR and the preset temperature Tset in the passenger room (TR-Tset) may be used as a parameter showing the degree of cooling demand.

FIG. 6 shows a control map applicable in a capacity control region where the deviation En is below the predetermined value Eno after cooling in the passenger room has been advanced. After the circumstantial condition is shifted from the cool down region just after starting cooling to the capacity control region, the calculation of the transmission ratio correction value B is processed based on the control map shown in FIG. 6.

In a case that the variable capacity compressor 1 is applied as shown in the embodiment of the present invention, a capacity of the compressor 1 is used as an index showing the degree of cooling demand. As the capacity of the compressor becomes smaller, the transmission ratio correction value B becomes a smaller value below 1.0. The capacity of the compressor may be determined by the control current In of the variable capacity device 19 mentioned above.

Figure 7:
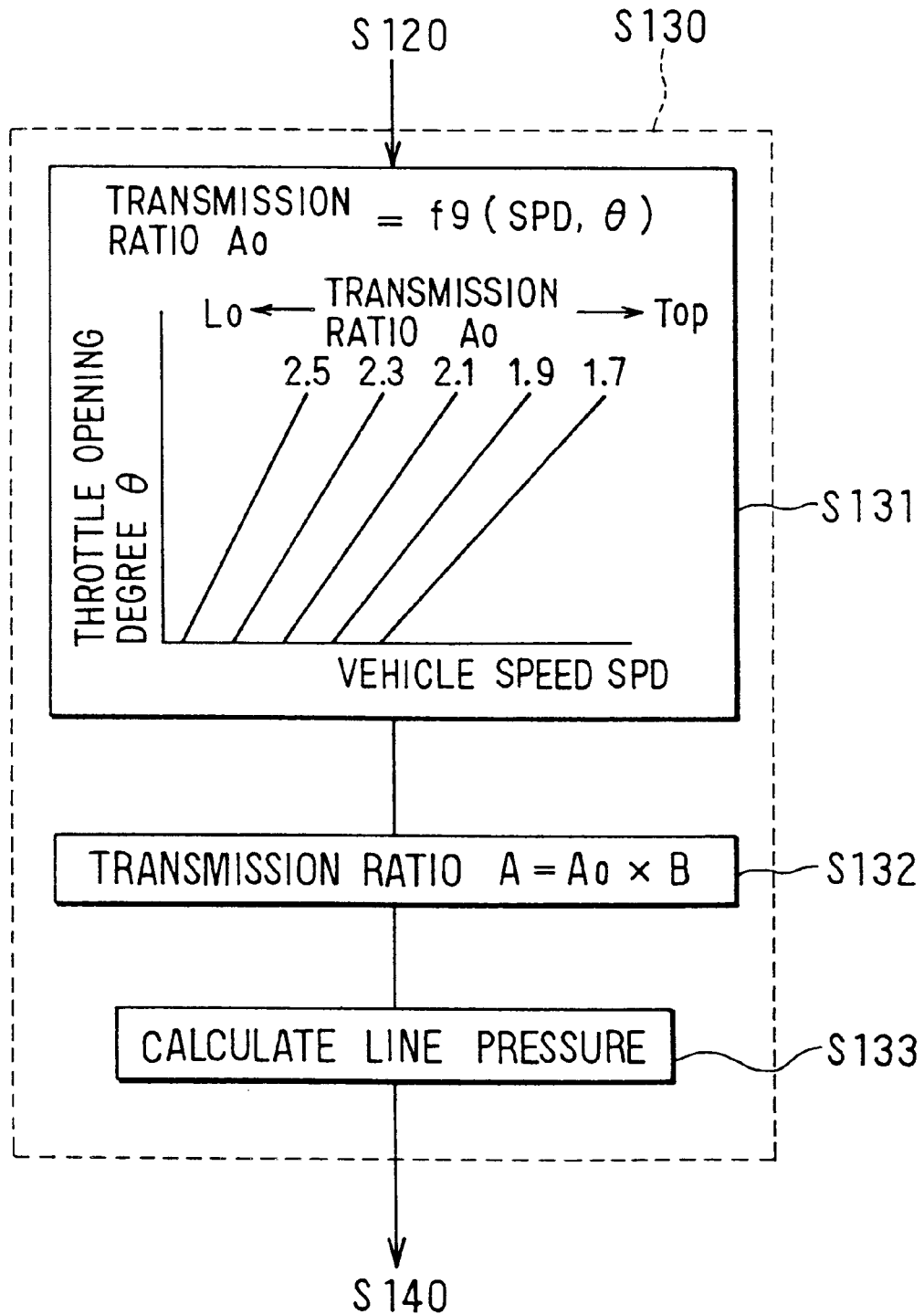
FIG. 7 is a flowchart showing a part of processes shown in FIG. 2.

Next, the transmission ratio control, which is a feature of the present invention, is described. FIG. 7 shows a typical example of Step S130 shown in FIG. 2. A reference transmission ratio Ao is calculated in use of a map shown in Step S131 based on the throttle opening degree θ and the vehicle speed SPD. Values 1.7 to 2.5 shown in the map of Step S131 are the values to be determined by the ratio (Ni/No) of the input revolution Ni of the transmission 24 to the output revolution No thereof, which may be varied continuously since the non-stage transmission 24 is the continuously variable transmission (CVT).

In the map of Step S 131, the transmission ratio 2.5 side corresponds to a low gear side of a conventional gear type transmission and the transmission ratio 1.7 side corresponds to a top gear side of the transmission.

A final output transmission ratio A is calculated according to a formula A=Ao×B at Step 132. That is, the reference transmission ratio Ao determined based on the vehicle operating conditions is corrected by the transmission ratio correction value B determined based on the degree of cooling demand to obtain the final output transmission ratio A. Next, at Step S133, the line pressure necessary for securing the final output transmission ratio A is calculated.

When the heat load for cooling is very heavy at a time just after starting cooling in a summer season, in other words, when the degree of cooling demand is very high, the transmission ratio correction value B reaches a maximum value since the deviation En in the control map shown in FIG. 5 is very large value. As a result, the output transmission ratio A becomes a value that the reference transmission ratio Ao is corrected so as to increase by the transmission ratio correction value B (toward low gear side).

As mentioned above, since the output transmission ratio A becomes larger (toward low gear side) and the revolution of the engine 4 increases so that the revolution of the compressor 1 may increase. Therefore, a refrigerant flow volume to be circulated through the evaporator 9 increases so that the cooling capacity of the evaporator 9 becomes high. Accordingly, temperature in the passenger room may be rapidly lowered even just after starting cooling so that feeling of the passenger for cooling may be improved.

Figure 8:
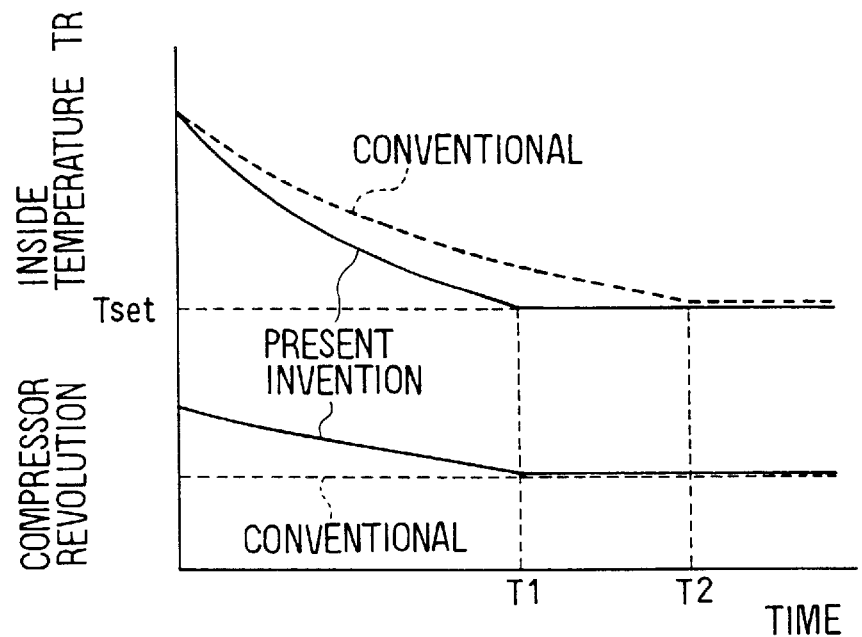
FIG. 8 is a chart showing a cooling effect of the transmission and air conditioning control system according to the first embodiment.

FIG. 8 shows a chart for explaining the effect mentioned above. A horizontal line shows a lapse time after starting cooling. According to the present invention, as the revolution of the compressor increases due to the corrected output transmission ratio A and the cooling capacity increases, a time necessary for decreasing the inside temperature TR to the preset temperature Tset may be reduced from T2 to T1, compared with the conventional technology (output transmission ratio A without correction).

Further, after the inside temperature TR decreases to the preset temperature Tset, the cooling capacity of the evaporator 9 is controlled so as to prevent frost of the evaporator 9. This cooling capacity control may be executed by increasing or decreasing the discharge capacity of the compressor 1 in the refrigeration cycle.

Figure 9:
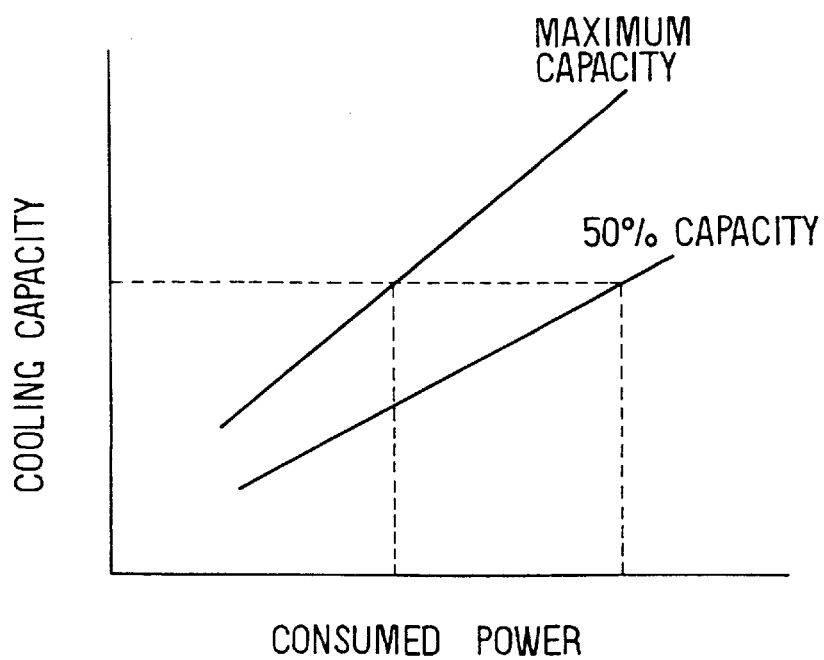
FIG. 9 is a characteristic chart showing a relationship among a discharge capacity, cooling capacity and consumed power of a compressor.

Moreover, as shown in FIG. 9, a consumed power of the compressor at a maximum (100%) capacity operation is less than that at a partial (for example, 50%) capacity operation, if compared with each other with respect to the same cooling capacity, since the efficiency of the compressor 1 becomes maximum at the maximum capacity operation.

Then, in the capacity control region (normal operating region) after the inside temperature Tr is reduced near the preset temperature Tset, the output transmission ratio A is corrected to a value smaller than the reference transmission ratio Ao (top gear side) by making the transmission ratio correction value B smaller than the neutral value 1.0 in use of the control map shown in FIG. 6.

If the output transmission ratio A is corrected to decrease (toward top gear side), the revolution of the vehicle engine 4 decreases and the revolution of the compressor 1 also decreases. Accordingly, as a time during which the discharge capacity of the compressor maintains to obtain the maximum capacity or near the maximum capacity becomes longer even in the capacity control region for air conditioning, the power consumption of the compressor may be reduced.

Figure 10:
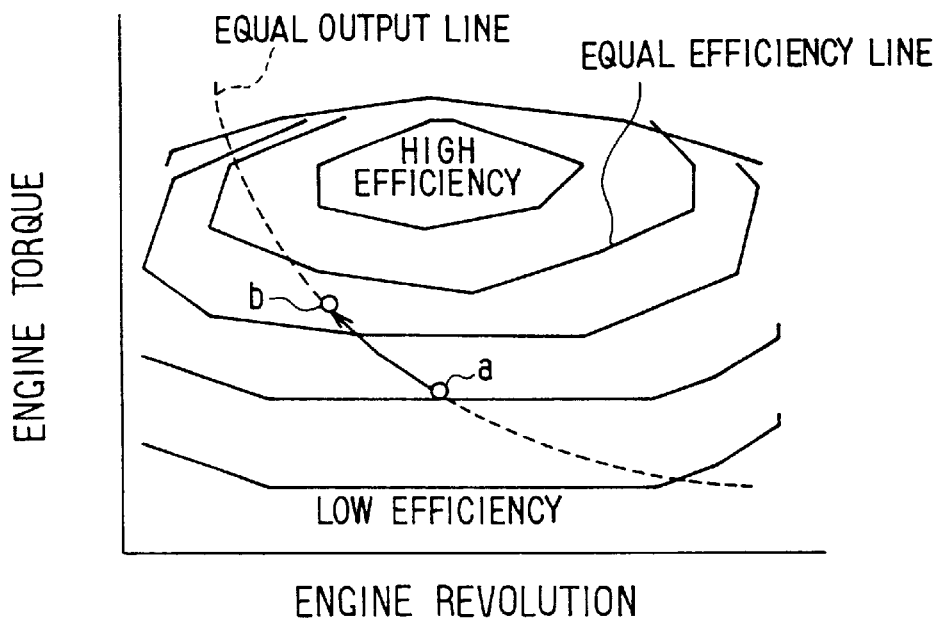
FIG. 10 is an engine performance chart.

Further, in the engine 4, when the output transmission ratio A is corrected to decrease (toward top gear side), the operating condition is shifted from a point a to a point b in an equal output line of an engine performance chart shown in FIG. 10 so that the efficiency of the engine itself may improve.

That is, in the capacity control region for air conditioning, the correction of the output transmission ratio A to the decreasing side may realize not only the decreased power consumption of the compressor but also the improved efficiency of the engine so that fuel consumption of the engine may be improved.

Figure 11:
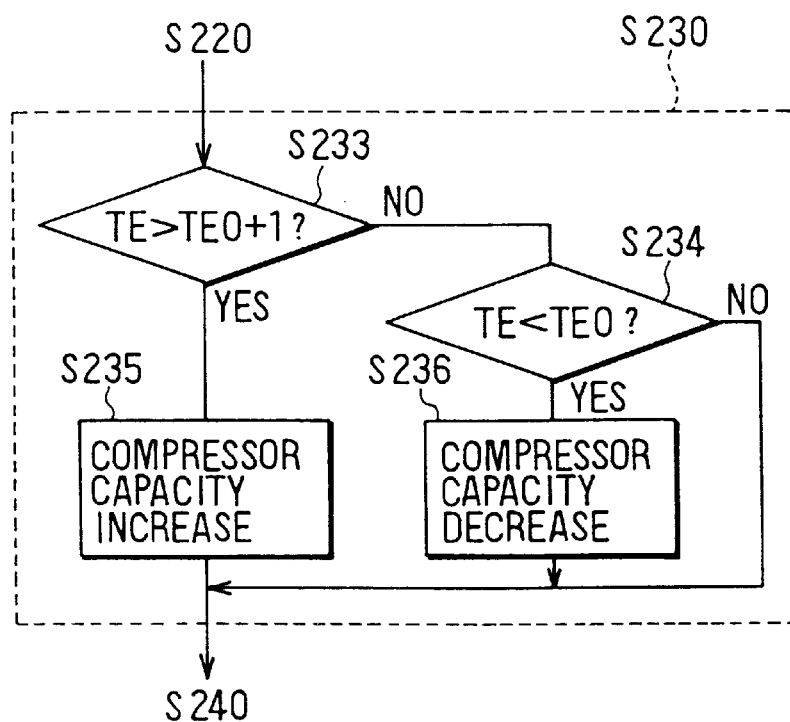
FIG. 11 is a flowchart showing variable capacity control processes of a compressor according to the first embodiment.

Next, FIG. 11 shows a flowchart for capacity control of the outside control type variable capacity compressor 1 according to the first embodiment. At Steps S233 and S234, a largeness of the actual evaporator air blow out temperature TE and that of the target evaporator air blow out temperature TEO are compared, respectively. The increased discharge capacity and decreased discharge capacity signals of the compressor 1 (control current In of the variable capacity device 19) are calculated at Steps S235 and S236, respectively. In this embodiment, the control current In is decreased for increasing the discharge capacity of the compressor at Step S235 and the control current In is increased for decreasing the discharge capacity of the compressor at Step S236.

(Second Embodiment)

According to the second embodiment, the compressor 1 is an outside control type variable capacity compressor in which the discharge capacity may be stepwise changed instead of the outside control type variable capacity compressor of the first embodiment in which the discharge capacity may be continuously changed.

Figure 12A:
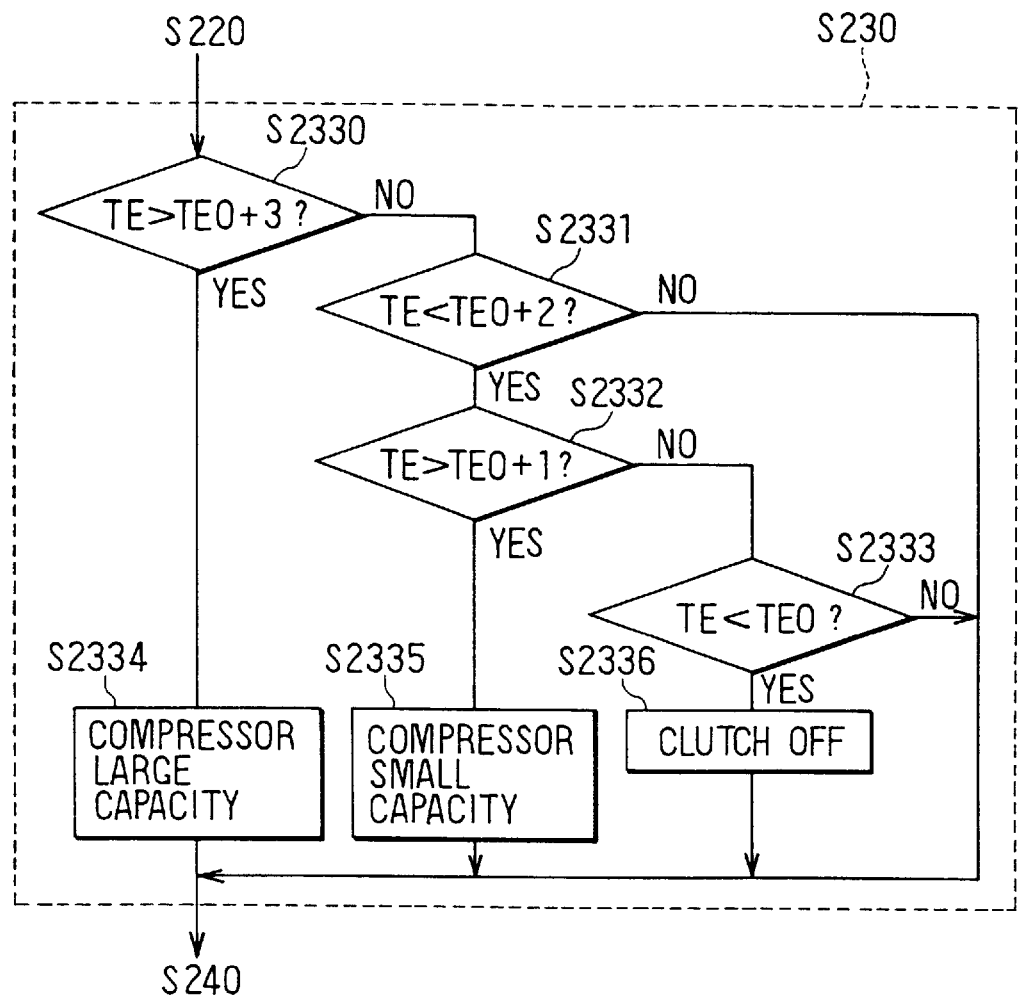
FIG. 12A is a flowchart showing stepwise capacity control processes of a compressor according to a second embodiment.
Figure 12B:
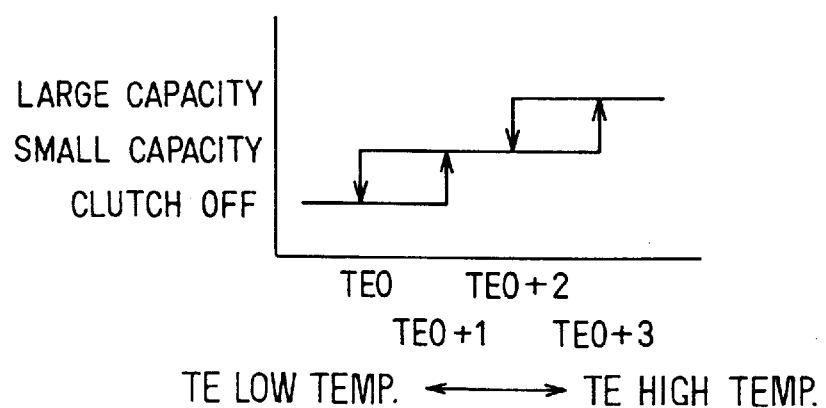
FIG. 12B is a chart explaining the stepwise capacity control of the compressor according to the second embodiment.

FIG. 12A shows a flowchart for stepwise capacity control of the compressor 1 according to the second embodiment. At Steps S2330 to S2333, a largeness of TE and that of TEO are compared, respectively. Large capacity and small capacity signals of the compressor 1 and an off signal of the electromagnetic clutch 2 are calculated at Steps S2334 to S2336, respectively. According to a change of largeness of TE, a large capacity operation of the compressor 1, a small capacity operation of the compressor 1 and a switching off of the clutch 2 (compressor stop) are respectively controlled as shown in FIG. 12B.

(Third Embodiment)

According to the third embodiment, the compressor 1 is a fixed capacity compressor in which the discharge capacity is not changed instead of the outside control type variable capacity compressor of the first or second embodiment in which the discharge capacity may be continuously or stepwise changed.

Figure 13A:
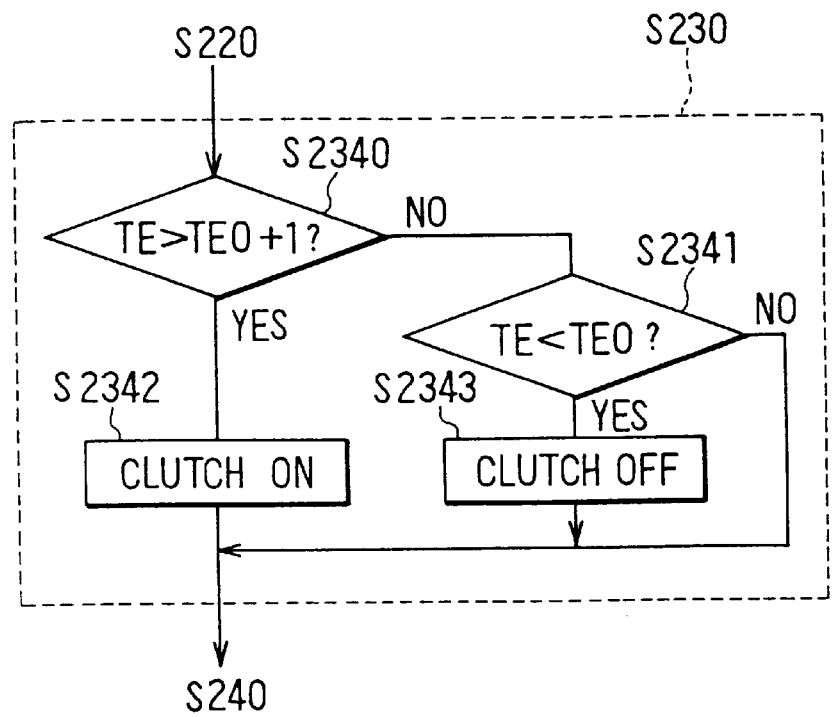
FIG. 13A is a flowchart showing intermittent control processes of a fixed capacity compressor according to a third embodiment.
Figure 13B:
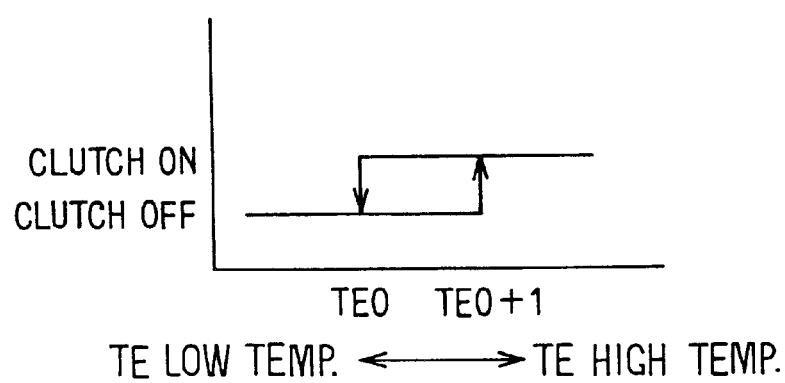
FIG. 13B is a chart explaining the intermittent control of the compressor according to the third embodiment.

FIG. 13A shows a flowchart for an on-off control of the fixed capacity compressor 1 according to the third embodiment. At Steps S2340 and S2341, a largeness of TE and that of TEO are compared, respectively. On and off signals of the electromagnetic clutch 2 are calculated at Steps S2342 and S2343, respectively. According to a change of largeness of TE, operation and non-operation of the compressor 1 are controlled as shown in FIG. 13B.

In a case that the fixed capacity compressor is used as a compressor 1 as shown in the third embodiment, when the output transmission ratio A is corrected to a value smaller than the reference transmission ratio Ao by the transmission ratio correction value B in the capacity control region (normal operation region) mentioned above, the revolution of the vehicle engine 4 decreases and the revolution of the compressor also decreases so that on operation periods of the compressor become longer. Accordingly, the number for changing over on and off operations of the compressor 1 becomes less so that shock due to the changing over of the on and off operations may be reduced.

In a case of the fixed capacity compressor 1, an on time percentage in on-off control of the compressor or an on time of the compressor 1 (clutch 2) is used as an index showing the degree of cooling demand in the capacity control region. The on time percentage of the compressor may be calculated by on time of the compressor/(on time of the compressor + off time of the compressor). The on time or on time percentage of the compressor mentioned above means an index showing an operating time of the compressor.

(Other Embodiment)

In the map of FIG. 7 for the transmission ratio at Step S 131, the reference transmission ratio Ao is calculated based on the throttle opening degree and the vehicle speed. However, in case of a diesel engine vehicle, the reference transmission ratio Ao is calculated based on an accelerator pedal depressing amount and the vehicle speed.

Further, instead of the non-stage transmission 24 in which the transmission ratio may be automatically and continuously changed, a multi-stage transmission that can automatically control a transmission ratio more stepwise than a normal gear type transmission may be used.

Though each width length of the input and output variable pulleys of the non-stage transmission is continuously changed by line pressure of the hydraulic mechanism according to the embodiments mentioned above, the present invention may be applied to a compound belt type non-stage transmission in which the hydraulic mechanism is not necessary or a troidal type non-stage transmission in which the belt is not used.

Furthermore, instead of the evaporator air blow out temperature TE, which is a physical quantity representing a cooling degree of evaporator, evaporator fin temperature, evaporator pipe temperature or refrigerant evaporation pressure (low pressure) may be used for determining the cooling degree of evaporator.

Though the degree of cooling demand is determined based on the deviation En' (=TR-Tset) between the inside temperature TR and the preset temperature Tset in FIG. 5, the extent of cooling demand may be determined only based on the preset temperature Tset. Further, the degree of cooling demand may be determined based on the outside temperature TAM since TAM causes a large influence on the heat load for cooling.

Instead of the electronic air conditioning control device 5 executing the on and off control of the electromagnetic clutch 2 as shown in FIG. 1, the electronic engine control device 22 may carry out the on and off control of the electromagnetic clutch 2.

Further, the electronic air conditioning control device 5, the electronic engine control device 22 and the transmission control device 23 may be integrated into a control device without providing independently.

Moreover, the construction of the air conditioner is not limited to the one shown in FIG. 1 and may be variously modified. For example, instead of the air mix door 14 adjusting a flow volume ratio between cool and heat air, a hot water volume adjusting valve of the hot water type heater core 12 may be used as temperature adjusting means for adjusting temperature of air to be blown into the passenger room. Further, instead of the refrigeration cycle R, an accumulator cycle, in which an accumulator is arranged on a suction side of the compressor instead of the receiver 7, may be used.

What is claimed is:

1. A transmission and air conditioning control system for a vehicle having an engine, a wheel and a passenger room comprising:

an air conditioner provided with a refrigeration cycle comprising a compressor driven by the engine and an evaporator for cooling the passenger room, the air conditioner generating a command signal by which a degree of cooling demand is determined;

a transmission connected between the engine and the wheel for changing an input revolution on a side of the engine to an output revolution on a side of the wheel at a transmission ratio of the input revolution to the output revolution that is variable according to operating conditions of the vehicle; and an electronically control device for controlling the transmission ratio to a reference value to be decided by the operating condition of the vehicle then prevailing and, upon receipt of the command signal, to a final value, which is higher than the reference value, when the degree of cooling demand decided is greater than a predetermined value, thereby to more increase the revolution of the engine than that based on the reference value so that a revolution of the compressor may be more increased;

wherein:

the electronically control device further controls the transmission ratio to the final value, which is lower than the reference value when the degree of cooling demand is smaller than a predetermined value, thereby to more reduce the revolution of the engine than that based on the reference value so that a revolution of the compressor may be more deduced.

2. A transmission and air conditioning control system according to claim 1, wherein the degree of cooling demand decided is at least one of a largeness of deviation between temperature of the evaporator and target temperature of the evaporator, a largeness of temperature of the passenger room, a largeness of physical quantity showing a cooling degree of the evaporator, a largeness of target temperature of air blown into the passenger room, a largeness of passenger preset temperature in the passenger room and a largeness of deviation between the temperature of the passenger room and the passenger preset temperature in the passenger room.

3. A transmission and air conditioning control system according to claim 1, wherein the control device is provided with first means for calculating a transmission ratio correction value, which is larger as the degree of cooling demand decided is higher, second means for calculating the reference value of the transmission ratio, and third means for calculating the final value of the transmission ratio by correcting the reference value based on the transmission ratio correction value.

4. A transmission and air conditioning control system for a vehicle having an engine, a wheel and a passenger room comprising:

an air conditioner provided with a refrigeration cycle comprising a compressor driven by the engine and an evaporator for cooling the passenger room, the air conditioner generating a command signal by which a degree of cooling demand is determined;

a transmission connected between the engine and the wheel for changing an input revolution on a side of the engine to an output revolution on a side of the wheel at a transmission ratio of the input revolution to the output revolution that is variable according to operating conditions of the vehicle; and an electronically control device for controlling the transmission ratio to a reference value to be decided by the operating condition of the vehicle then prevailing and, upon receipt of the command signal, to a final value, which is lower than the reference value, when the degree of cooling demand decided is smaller than a predetermined value, thereby to more reduce the revolution of the engine than that based on the reference value so that a revolution of the compressor may be more reduced.

5. A transmission and air conditioning control system according to claim 2, wherein the compressor is a variable capacity compressor whose discharge capacity is varied according to cooling degrees of the evaporator and a largeness of the discharge capacity thereof is the degree of cooling demand decided so that the degree of cooling demand becomes lower as the discharge capacity becomes smaller.

6. A transmission and air conditioning control system according to claim 4, wherein the compressor is a fixed capacity compressor whose operation is intermittently controlled according to cooling degrees of the evaporator and an operating percentage of the fixed capacity compressor is the degree of cooling demand decided so that the degree of cooling demand becomes lower as the operating percentage thereof becomes smaller.

7. A transmission and air conditioning control system according to claim 4, wherein the control device is provided with first means for calculating a transmission ratio correction value, which is larger as the degree of cooling demand decided is higher, second means for calculating the reference value of the transmission ratio by and third means for calculating the final value of the transmission ratio by correcting the reference value based on the transmission ratio correction value.

* * * * *